US011654939B2

(12) United States Patent
Jeon et al.

(10) Patent No.: US 11,654,939 B2
(45) Date of Patent: May 23, 2023

(54) AUTONOMOUS DRIVING APPARATUS AND METHOD THAT OUTPUTS DIFFERENT WARNINGS BASED ON DRIVING RISK

(71) Applicant: HYUNDAI MOBIS Co., Ltd., Seoul (KR)

(72) Inventors: Byeong Hwan Jeon, Yongin-si (KR); Jun Han Lee, Yongin-si (KR); Hyuk Lee, Yongin-si (KR); Soon Jong Jin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 298 days.

(21) Appl. No.: 16/878,467

(22) Filed: May 19, 2020

(65) Prior Publication Data
US 2020/0369297 A1 Nov. 26, 2020

(30) Foreign Application Priority Data
May 20, 2019 (KR) .......................... 10-2019-0058611

(51) Int. Cl.
  *B60W 60/00* (2020.01)
  *B60W 40/09* (2012.01)
  *G06V 20/56* (2022.01)

(52) U.S. Cl.
  CPC ........ *B60W 60/0059* (2020.02); *B60W 40/09* (2013.01); *B60W 60/0016* (2020.02);
  (Continued)

(58) Field of Classification Search
  CPC ......... B60W 60/0059; B60W 60/0016; B60W 60/0017; B60W 40/09; B60W 2540/227; G06V 20/56
  See application file for complete search history.

(56) References Cited

U.S. PATENT DOCUMENTS

| 2015/0158469 A1* | 6/2015 | Cheatham, III | .... B60T 8/17558 701/96 |
| 2016/0071418 A1* | 3/2016 | Oshida | ................ G05D 1/0295 701/23 |

(Continued)

FOREIGN PATENT DOCUMENTS

KR   10-1998-0068399   10/1998

OTHER PUBLICATIONS

English Translation of Publication No. JP2017030748A Author: Nishii et al. Title: Driving Support Apparatus Date: Feb. 9, 2017 (Year: 2017).*

(Continued)

*Primary Examiner* — James J Lee
*Assistant Examiner* — Steven Vu Nguyen
(74) *Attorney, Agent, or Firm* — H.C. Park & Associates, PLC

(57) ABSTRACT

In an autonomous driving apparatus and method, the apparatus includes a sensor unit, an output unit, a memory, and a processor configured to control the autonomous driving of an ego vehicle based on a map information stored in the memory. The processor generates an actual driving trajectory and an expected driving trajectory of a surrounding vehicle around the ego vehicle based on driving information of the surrounding vehicle detected by the sensor unit and the map information and controls one or more of the driving of the ego vehicle and provides communication with an external organization, based on a state of a passenger detected by the sensor unit when an autonomous driving mode of the ego vehicle is turned off, and based on an autonomous driving risk of the ego vehicle determined based on a trajectory error between the actual driving trajectory and expected driving trajectory of the surrounding vehicle.

14 Claims, 8 Drawing Sheets

(52) U.S. Cl.
CPC ......... *B60W 60/0017* (2020.02); *G06V 20/56* (2022.01); *B60W 2540/227* (2020.02)

(56) References Cited

U.S. PATENT DOCUMENTS

| | | | |
|---|---|---|---|
| 2021/0225172 A1* | 7/2021 | Ferguson | G08G 1/166 |
| 2022/0066457 A1* | 3/2022 | Kindo | B60W 50/0097 |

OTHER PUBLICATIONS

English Translation of Publication No. JP2008100592A Author: Hashimoto et al. Title: Traveling Direction Estimation Device for Vehicle Driving Support System Date: May 1, 2008 (Year: 2008).*

* cited by examiner

AUTONOMOUS DRIVING APPARATUS AND METHOD THAT OUTPUTS DIFFERENT WARNINGS BASED ON DRIVING RISK

CROSS-REFERENCE TO RELATED APPLICATION

This application claims priority from and the benefit of Korean Patent Application No. 10-2019-0058611, filed on May 20, 2019, which are hereby incorporated by reference for all purposes as if set forth herein.

BACKGROUND

Field

Exemplary embodiments of the present disclosure relate to an autonomous driving apparatus and method applied to an autonomous vehicle.

Discussion of the Background

Today's automobile industry is moving towards an implementation of autonomous driving to minimize the intervention of a driver in vehicle driving. An autonomous vehicle refers to a vehicle that autonomously determines a driving path by recognizing a surrounding environment using an external information detection and processing function upon driving and independently travels using its own motive power.

The autonomous vehicle can autonomously travel up to a destination while preventing a collision against an obstacle on a driving path and controlling a vehicle speed, and driving direction based on a shape of a road although a driver does not manipulate a steering wheel, an acceleration pedal or a brake. For example, the autonomous vehicle may perform acceleration in a straight road, and may perform deceleration while changing a driving direction in accordance with the curvature of a curved road in the curved road.

In order to guarantee the safe driving of an autonomous vehicle, the driving of the autonomous vehicle needs to be controlled based on a measured driving environment by precisely measuring the driving environment using sensors mounted on the vehicle and continuing to monitor the driving state of the vehicle. To this end, various sensors such as a LIDAR sensor, a radar sensor, an ultrasonic sensor and a camera sensor, that is, sensors for detecting surrounding objects such as surrounding vehicles, pedestrians and fixed facilities, are applied to the autonomous vehicle. Data output by such a sensor is used to determine information on a driving environment, for example, state information such as a location, shape, moving direction and moving speed of a surrounding object.

Furthermore, the autonomous vehicle also has a function for optimally determining a driving path and driving lane by determining and correcting the location of the vehicle using previously stored map data, controlling the driving of the vehicle so that the vehicle does not deviate from the determined path and lane, and performing defense and evasion driving for a risk factor in a driving path or a vehicle that suddenly appears nearby.

The above information disclosed in this Background section is only for enhancement of understanding of the background of the invention and, therefore, it may contain information that does not constitute prior art.

SUMMARY

An embodiment is directed to the provision of an autonomous driving apparatus and method, which can improve the driving stability and driving accuracy of an autonomous vehicle by outputting a proper warning to a passenger based on an autonomous driving risk of the autonomous vehicle and effectively handle an emergency situation, which occurs in the passenger, by controlling the driving of an ego vehicle and communication with an external organization based on a state of the passenger.

In the embodiment, an autonomous driving apparatus includes a sensor unit configured to detect a surrounding vehicle around an ego vehicle that autonomously travels and a state of a passenger who has got in the ego vehicle, an output unit, a memory configured to store map information, and a processor configured to control the autonomous driving of the ego vehicle based on the map information stored in the memory. The processor is configured to generate an actual driving trajectory and expected driving trajectory of the surrounding vehicle based on driving information of the surrounding vehicle detected by the sensor unit and the map information stored in the memory and to control one or more of the driving of the ego vehicle and communication with an external organization, based on a state of the passenger detected by the sensor unit when an autonomous driving mode of the ego vehicle is turned off, based on an autonomous driving risk of the ego vehicle determined based on a trajectory error between the actual driving trajectory and expected driving trajectory of the surrounding vehicle.

In an embodiment, the processor is configured to determine the autonomous driving risk of the ego vehicle based on whether a driving mode of the surrounding vehicle is an autonomous driving mode and the trajectory error between the actual driving trajectory and expected driving trajectory of the surrounding vehicle and to output a warning to the passenger through the output unit at a level corresponding to the determined autonomous driving risk. The processor outputs the warnings to the passenger through the output unit, as first to third levels based on ascending order of the autonomous driving risk of the ego vehicle.

In an embodiment, the processor is configured to output, to the passenger, a warning corresponding to the first level through the output unit when the driving mode of the surrounding vehicle is the autonomous driving mode and to output, to the passenger, a warning corresponding to the second level through the output unit when the driving mode of the surrounding vehicle is a manual driving mode.

In an embodiment, the processor is configured to perform diagnosis of reliability of autonomous driving control over the ego vehicle based on a size of the trajectory error between the actual driving trajectory and expected driving trajectory of the surrounding vehicle or a cumulative addition of the trajectory errors and to output, to the passenger, a warning corresponding to the third level through the output unit if, as a result of the execution of the diagnosis, it is determined that the autonomous driving control over the ego vehicle is unreliable.

In an embodiment, the processor is configured to determine that the autonomous driving control over the ego vehicle is unreliable, when the state in which the size of the trajectory error is a preset first critical value or more occurs within a preset first critical time.

In an embodiment, the processor is configured to additionally perform the diagnosis of reliability using the cumulative addition of the trajectory errors, in the state in which the size of the trajectory error is less than the first critical value for the first critical time and to determine that the autonomous driving control over the ego vehicle is unreliable, when the state in which the cumulative addition obtained by accumulating and adding the trajectory errors is a preset second critical value or more occurs within a second critical time preset as a value greater than the first critical time, in the state in which the size of the trajectory error is less than the first critical value for the first critical time.

In an embodiment, the processor is configured to release the warning output through the output unit when the size of the trajectory error becomes less than the first critical value, when the cumulative addition of the trajectory errors becomes less than the second critical value or when it is determined that the state of the passenger detected by the sensor unit is a forward looking state, after outputting the warning to the passenger through the output unit.

In an embodiment, the processor is configured to turn off the autonomous driving mode of the ego vehicle if it is determined that the state of the passenger detected by the sensor unit does not correspond to the forward looking state, in a state in which the size of the trajectory error becomes the first critical value or more or the cumulative addition of the trajectory errors becomes the second critical value or more.

In an embodiment, the processor is configured to allow the driving mode of the ego vehicle to enter an emergency autonomous driving mode so that the ego vehicle moves to a specific point necessary for the passenger, when a manual driving manipulation is not performed by the passenger after the autonomous driving mode of the ego vehicle is turned off.

In an embodiment, the processor is configured to transmit a rescue signal to the external organization when a behavior of the passenger is not detected through the sensor unit or a bio signal of the passenger detected through the sensor unit has a pattern different from that of a normal bio signal previously stored in the memory as a bio signal in a normal physical state of the passenger.

In an embodiment, an autonomous driving method includes controlling, by a processor, an autonomous driving of an ego vehicle based on map information stored in a memory, generating, by the processor, an actual driving trajectory and expected driving trajectory of a surrounding vehicle around the ego vehicle based on driving information of the surrounding vehicle detected by a sensor unit and the map information stored in the memory, and controlling, by the processor, one or more of the driving of the ego vehicle and communication with an external organization, based on a state of a passenger detected by the sensor unit when an autonomous driving mode of the ego vehicle is turned off, based on an autonomous driving risk of the ego vehicle determined based on a trajectory error between the actual driving trajectory and expected driving trajectory of the surrounding vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
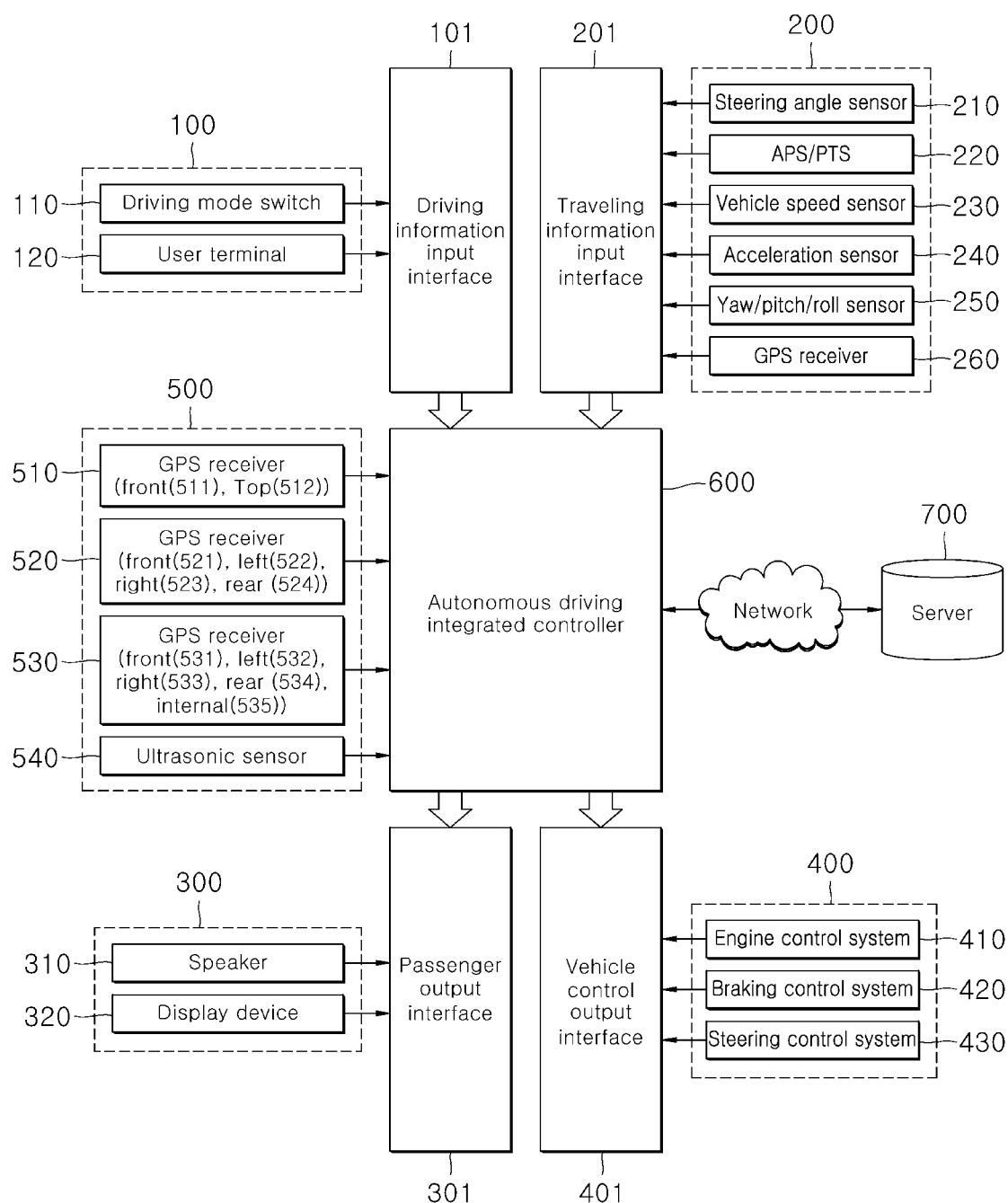
FIG. 1 is a general block diagram of an autonomous driving control system to which an autonomous driving apparatus according to an embodiment of the present disclosure may be applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, an autonomous driving apparatus and method will be described below with reference to the accompanying drawings through various exemplary embodiments. The thickness of lines or the size of elements shown in the drawings in this process may have been exaggerated for the clarity of a description and for convenience' sake. Terms to be described below have been defined by taking into consideration their functions in the disclosure, and may be changed depending on a user or operator's intention or practice. Accordingly, such terms should be interpreted based on the overall contents of this specification.

Figure 2:
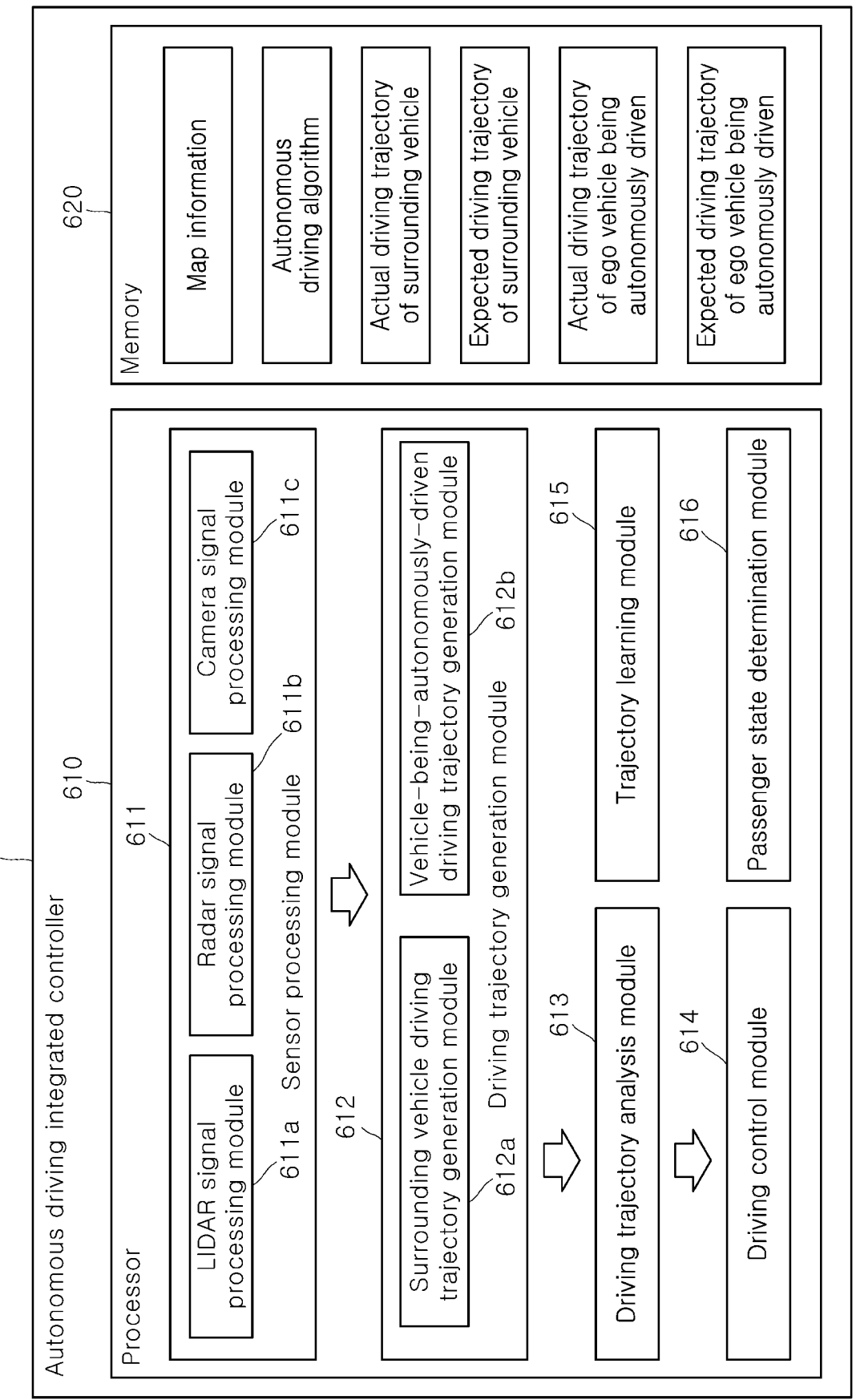
FIG. 2 is a block diagram illustrating a detailed configuration of an autonomous driving integrated controller in the autonomous driving apparatus according to an embodiment of the present disclosure.
Figure 3:
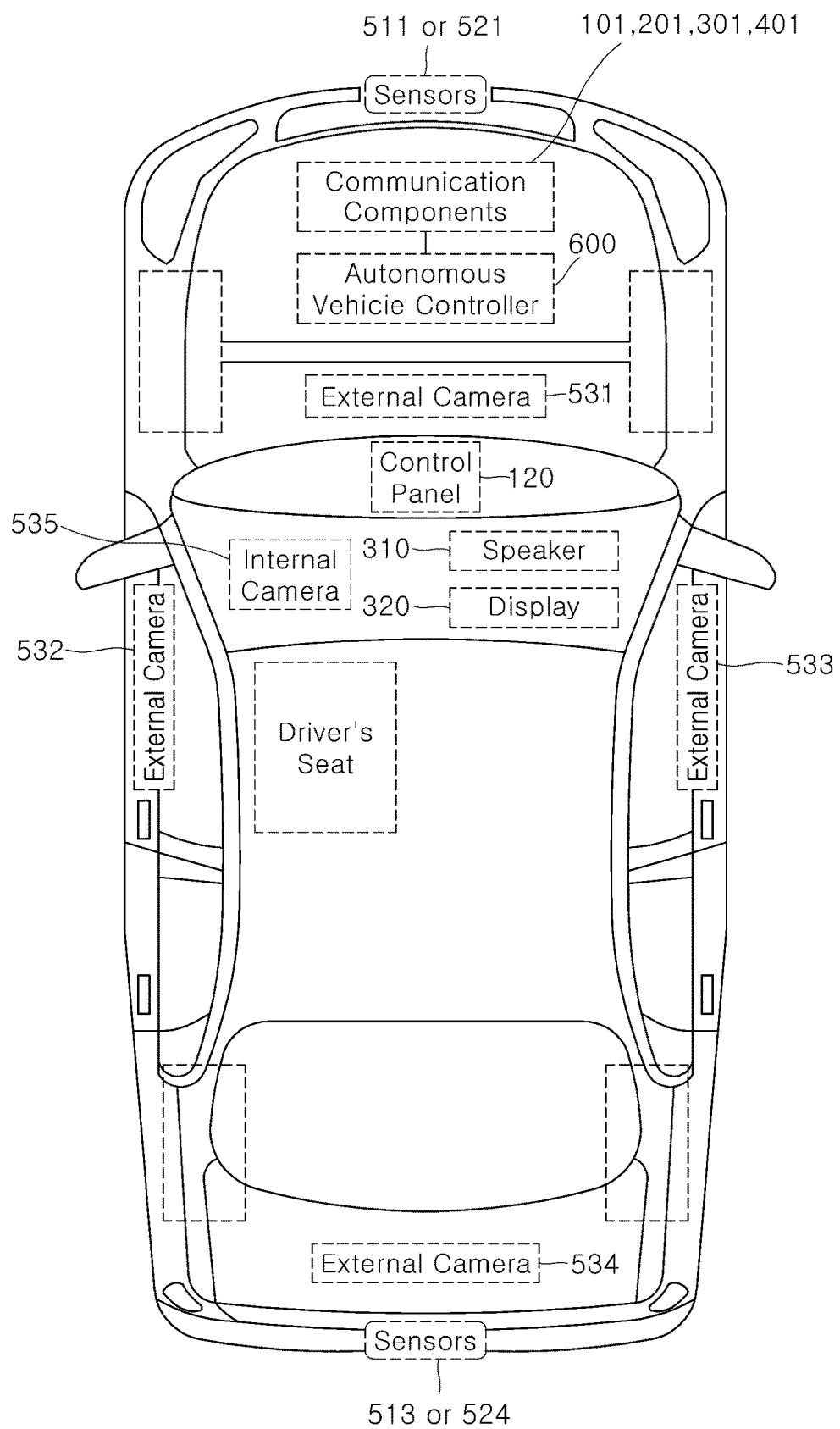
FIG. 3 is an exemplary diagram illustrating an example in which the autonomous driving apparatus according to an embodiment of the present disclosure is applied to a vehicle.
Figure 4:
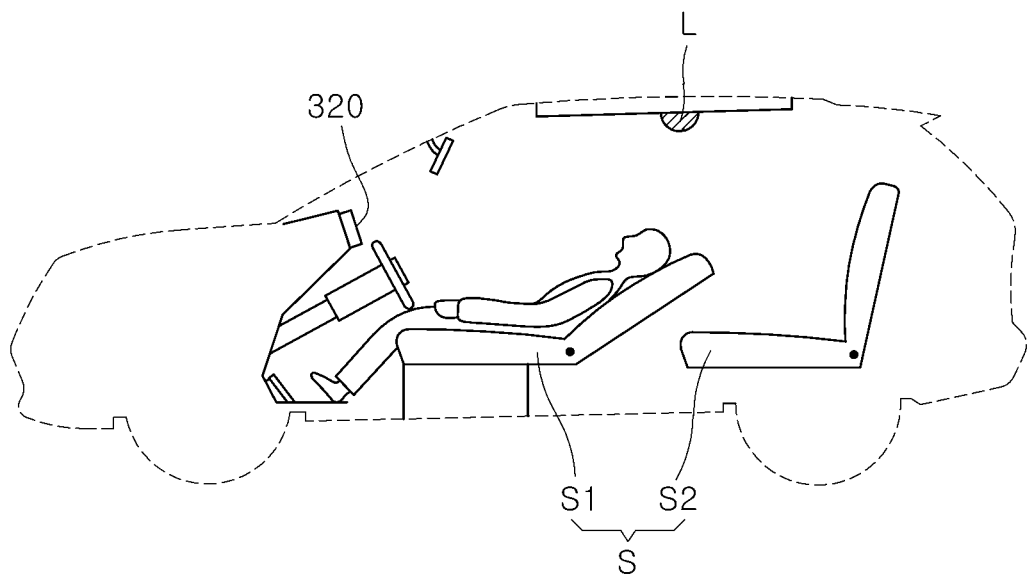
FIG. 4 is an exemplary diagram illustrating an example of an internal structure of a vehicle to which the autonomous driving apparatus according to an embodiment of the present disclosure is applied.
Figure 5:
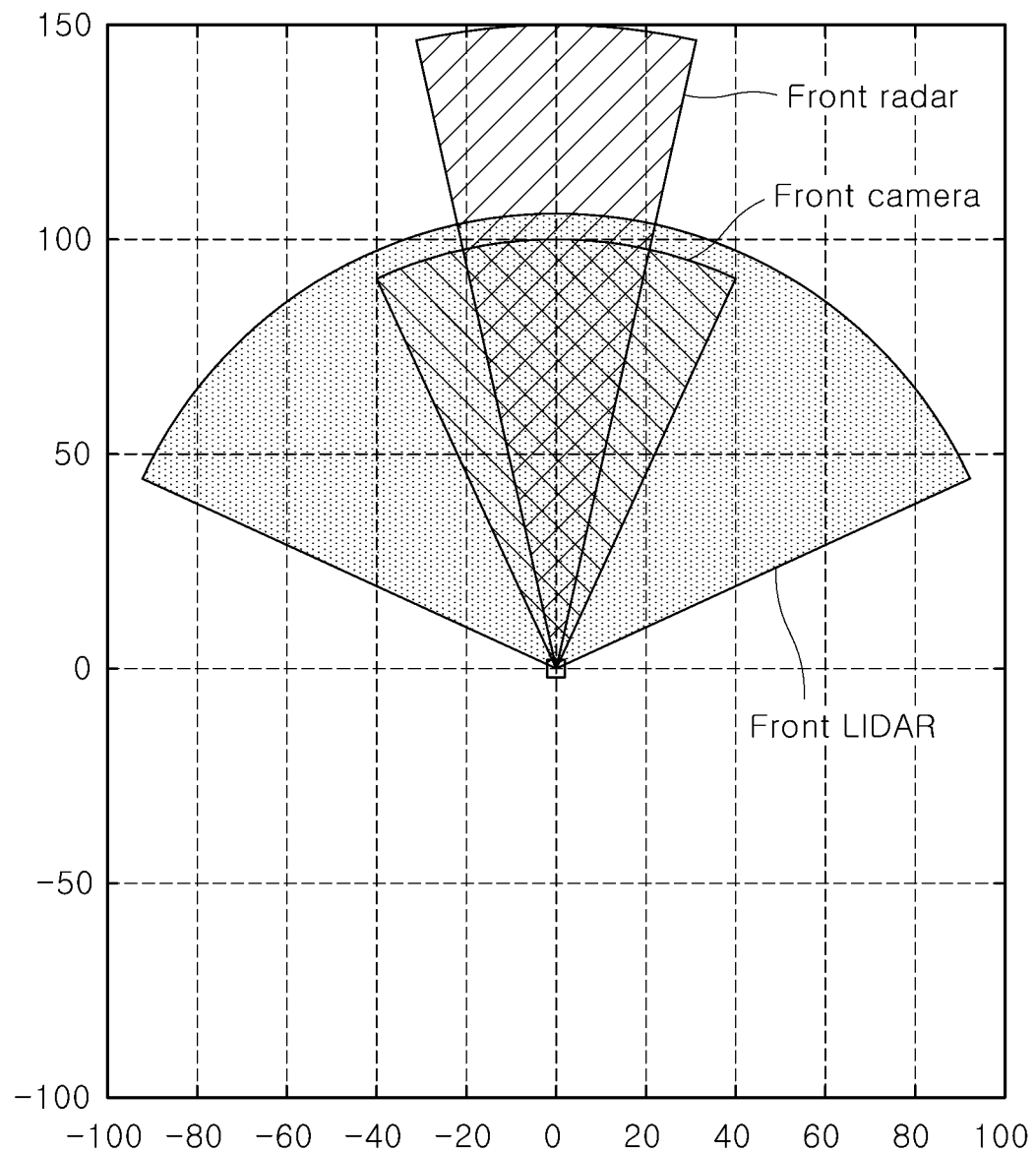
FIG. 5 is an exemplary diagram illustrating an example of a set distance and horizontal field of view within which a LIDAR sensor, a radar sensor and a camera sensor may detect a surrounding object in the autonomous driving apparatus according to an embodiment of the present disclosure.
Figure 6:
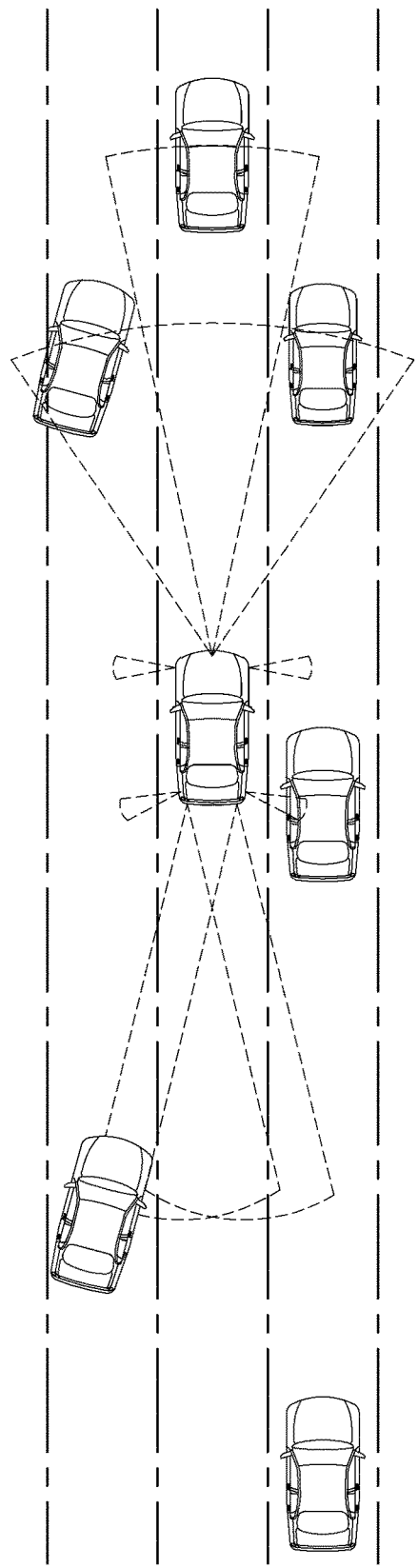
FIG. 6 is an exemplary diagram illustrating an example in which a sensor unit detects a surrounding vehicle in the autonomous driving apparatus according to an embodiment of the present disclosure

FIG. 1 is a general block diagram of an autonomous driving control system to which an autonomous driving apparatus according to an embodiment of the present disclosure may be applied. FIG. 2 is a block diagram illustrating a detailed configuration of an autonomous driving integrated controller in the autonomous driving apparatus according to an embodiment of the present disclosure. FIG. 3 is an exemplary diagram illustrating an example in which the autonomous driving apparatus according to an embodiment of the present disclosure is applied to a vehicle. FIG. 4 is an exemplary diagram illustrating an example of an internal structure of a vehicle to which the autonomous driving apparatus according to an embodiment of the present disclosure is applied. FIG. 5 is an exemplary diagram illustrating an example of a set distance and horizontal field of view within which a LIDAR sensor, a radar sensor and a camera sensor may detect a surrounding object in the autonomous driving apparatus according to an embodiment of the present disclosure. FIG. 6 is an exemplary diagram illustrating an example in which a sensor unit detects a surrounding vehicle in the autonomous driving apparatus according to an embodiment of the present disclosure.

First, the structure and functions of an autonomous driving control system to which an autonomous driving apparatus according to the present embodiment may be applied are described with reference to FIGS. 1 and 3. As illustrated in FIG. 1, the autonomous driving control system may be implemented based on an autonomous driving integrated controller 600 configured to transmit and receive data necessary for autonomous driving control of a vehicle through a driving information input interface 101, a traveling information input interface 201, a passenger output interface 301 and a vehicle control output interface 401.

The autonomous driving integrated controller 600 may obtain, through the driving information input interface 101, driving information based on a manipulation of a passenger for a user input unit 100 in an autonomous driving mode or manual driving mode of a vehicle. As illustrated in FIG. 1, the user input unit 100 may include a driving mode switch 110 and a user terminal 120 (e.g., a navigation terminal mounted on a vehicle or a smartphone or tablet PC owned by a passenger), for example. Accordingly, driving information may include driving mode information and navigation information of a vehicle. For example, a driving mode (i.e., an autonomous driving mode/manual driving mode or a sport mode/eco mode/safe mode/normal mode) of a vehicle determined by a manipulation of a passenger for the driving mode switch 110 may be transmitted to the autonomous driving integrated controller 600 through the driving information input interface 101 as the driving information. Furthermore, navigation information, such as the destination of a passenger and a path up to the destination (e.g., the shortest path or preference path, selected by the passenger, among candidate paths up to the destination) input by a passenger through the user terminal 120, may be transmitted to the autonomous driving integrated controller 600 through the driving information input interface 101 as the driving information. The user terminal 120 may be implemented as a control panel (e.g., touch screen panel) that provides a user interface (UI) through which a driver inputs or modifies information for autonomous driving control of a vehicle. In this case, the driving mode switch 110 may be implemented as a touch button on the user terminal 120.

Furthermore, the autonomous driving integrated controller 600 may obtain traveling information indicative of a driving state of a vehicle through the traveling information input interface 201. The traveling information may include a steering angle formed when a passenger manipulates a steering wheel, an acceleration pedal stroke or brake pedal stroke formed when an acceleration pedal or brake pedal is stepped on, and various types of information indicative of driving states and behaviors of a vehicle, such as a vehicle speed, acceleration, a yaw, a pitch and a roll, that is, behaviors formed in the vehicle. The pieces of traveling information may be detected by a traveling information detection unit 200, including a steering angle sensor 210, an accel position sensor (APS)/pedal travel sensor (PTS) 220, a vehicle speed sensor 230, an acceleration sensor 240, and a yaw/pitch/roll sensor 250, as illustrated in FIG. 1. Furthermore, the traveling information of a vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201, and may be used to control the driving of a vehicle in the autonomous driving mode or manual driving mode of the vehicle.

Furthermore, the autonomous driving integrated controller 600 may transmit, to an output unit 300, driving state information, provided to a passenger, through the passenger output interface 301 in the autonomous driving mode or manual driving mode of a vehicle. That is, the autonomous driving integrated controller 600 transmits driving state information of a vehicle to the output unit 300 so that a passenger can check the autonomous driving state or manual driving state of the vehicle based on the driving state information output through the output unit 300. The driving state information may include various types of information indicative of driving states of a vehicle, such as a current driving mode, transmission range and vehicle speed of the vehicle, for example. Furthermore, if it is determined that it is necessary to warn a driver in the autonomous driving mode or manual driving mode of a vehicle along with the driving state information, the autonomous driving integrated controller 600 transmits warning information to the output unit 300 through the passenger output interface 301 so that the output unit 300 can output a warning to the driver. In order to output such driving state information and warning information acoustically and visually, the output unit 300 may include a speaker 310 and a display 320 as illustrated in FIG. 1. In this case, the display 320 may be implemented as the same device as the user terminal 120 or may be implemented as an independent device separated from the user terminal 120.

Furthermore, the autonomous driving integrated controller 600 may transmit control information for driving control of a vehicle to a low-ranking control system 400, applied to a vehicle, through the vehicle control output interface 401 in the autonomous driving mode or manual driving mode of the vehicle. As illustrated in FIG. 1, the low-ranking control system 400 for driving control of a vehicle may include an engine control system 410, a braking control system 420 and a steering control system 430. The autonomous driving integrated controller 600 may transmit engine control information, braking control information and steering control information, as the control information, to the respective low-ranking control systems 410, 420 and 430 through the vehicle control output interface 401. Accordingly, the engine control system 410 may control the vehicle speed and acceleration of a vehicle by increasing or decreasing fuel supplied to an engine. The braking control system 420 may control the braking of the vehicle by controlling braking power of the vehicle. The steering control system 430 may control the steering of the vehicle through a steering apparatus (e.g., motor driven power steering (MDPS) system) applied to the vehicle.

As described above, the autonomous driving integrated controller 600 according to the present embodiment may obtain driving information based on a manipulation of a driver and traveling information indicative of a driving state of a vehicle through the driving information input interface 101 and the traveling information input interface 201, respectively, may transmit, to the output unit 300, driving state information and warning information, generated based on an autonomous driving algorithm processed by a processor 610 therein, through the passenger output interface 301, and may transmit, to the low-ranking control system 400, control information, generated based on the autonomous driving algorithm processed by the processor 610, through the vehicle control output interface 401 so that driving control of the vehicle is performed.

In order to guarantee stable autonomous driving of a vehicle, it is necessary to continuously monitor a driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a surrounding object of a vehicle, such as a surrounding vehicle, pedestrian, road or fixed facility (e.g., a signal light, a signpost, a traffic sign or a construction fence). The sensor unit 500 may include one or more of a LIDAR sensor 510, a radar sensor 520 and a camera sensor 530 in order to detect a surrounding object outside a vehicle, as illustrated in FIG. 1.

The LIDAR sensor 510 may transmit a laser signal to the periphery of a vehicle, and may detect a surrounding object outside the vehicle by receiving a signal reflected and returned from a corresponding object. The LIDAR sensor 510 may detect a surrounding object located within a set distance, set vertical field of view and set horizontal field of view, which are predefined depending on its specifications. The LIDAR sensor 510 may include a front LIDAR sensor 511, a top LIDAR sensor 512 and a rear LIDAR sensor 513 installed at the front, top and rear of a vehicle, respectively, but the installation location of each sensor and the number of sensors installed are not limited to a specific embodiment. A threshold for determining the validity of a laser signal reflected and returned from a corresponding object may be previously stored in a memory 620 of the autonomous driving integrated controller 600. The processor 610 of the autonomous driving integrated controller 600 may determine a location (including a distance to a corresponding object), speed and moving direction of the corresponding object using a method of measuring the time taken for a laser signal, transmitted through the LIDAR sensor 510, to be reflected and returned from the corresponding object.

The radar sensor 520 may radiate electromagnetic waves around a vehicle, and may detect a surrounding object outside the vehicle by receiving a signal reflected and returned from a corresponding object. The radar sensor 520 may detect a surrounding object within a set distance, set vertical field of view and set horizontal field of view, which are predefined depending on its specifications. The radar sensor 520 may include a front radar sensor 521, a left radar sensor 522, a right radar sensor 523 and a rear radar sensor 524 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object using a method of analyzing power of electromagnetic waves transmitted and received through the radar sensor 520.

The camera sensor 530 may detect a surrounding object outside a vehicle by photographing the periphery of the vehicle, and may detect a surrounding object within a set distance, set vertical field of view and set horizontal field of view, which are predefined depending on its specifications. The camera sensor 530 may include a front camera sensor 531, a left camera sensor 532, a right camera sensor 533 and a rear camera sensor 534 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object by applying predefined image processing to an image captured by the camera sensor 530. Furthermore, an internal camera sensor 535 for photographing the inside of a vehicle may be mounted at a given location (e.g., rear view mirror) within the vehicle. The processor 610 of the autonomous driving integrated controller 600 may monitor a behavior and state of a passenger based on an image captured by the internal camera sensor 535, and may output guidance or a warning to the passenger through the output unit 300.

As illustrated in FIG. 1, the sensor unit 500 may further include an ultrasonic sensor 540 in addition to the LIDAR sensor 510, the radar sensor 520 and the camera sensor 530, and may further adopt various types of sensors for detecting a surrounding object of a vehicle along with the sensors. FIG. 3 illustrates an example in which in order to help understanding of the present embodiment, the front LIDAR sensor 511 or the front radar sensor 521 has been installed at the front of a vehicle, the rear LIDAR sensor 513 or the rear radar sensor 524 has been installed at the rear of the vehicle, and the front camera sensor 531, the left camera sensor 532, the right camera sensor 533 and the rear camera sensor 534 have been installed at the front, left, right and rear of the vehicle, respectively. However, as described above, the installation location of each sensor and the number of sensors installed are not limited to a specific embodiment. FIG. 5 illustrates an example of a set distance and horizontal field of view within which the LIDAR sensor 510, the radar sensor 520 and the camera sensor 530 may detect a surrounding object ahead of the vehicle. FIG. 6 illustrates an example in which each sensor detects a surrounding object. FIG. 6 is merely an example of the detection of a surrounding object. A method of detecting a surrounding object is determined by the installation location of each sensor and the number of sensors installed. A surrounding vehicle and a surrounding object in the omnidirectional area of an ego vehicle that autonomously travels may be detected depending on a configuration of the sensor unit 500.

Furthermore, in order to determine a state of a passenger within a vehicle, the sensor unit 500 may further include a microphone and bio sensor for detecting a voice and bio signal (e.g., heart rate, electrocardiogram, respiration, blood pressure, body temperature, electroencephalogram, hotoplethysmography (or pulse wave) and blood sugar) of the passenger. The bio sensor may include a heart rate sensor, an electrocardiogram sensor, a respiration sensor, a blood pressure sensor, a body temperature sensor, an electroencephalogram sensor, a photoplethysmography sensor and a blood sugar sensor.

FIG. 4 illustrates an example of an internal structure of a vehicle. An internal device whose state is controlled by a manipulation of a passenger, such as a driver or fellow passenger of a vehicle, and which supports driving or convenience (e.g., rest or entertainment activities) of the passenger may be installed within the vehicle. Such an internal device may include a vehicle seat S in which a passenger is seated, a lighting device L such as an internal light and a mood lamp, the user terminal 120, the display 320, and an internal table. The state of the internal device may be controlled by the processor 610.

The angle of the vehicle seat S may be adjusted by the processor 610 (or by a manual manipulation of a passenger). If the vehicle seat S is configured with a front row seat S1 and a back row seat S2, only the angle of the front row seat S1 may be adjusted. If the back row seat S2 is not provided and the front row seat S1 is divided into a seat structure and a footstool structure, the front row seat S1 may be implemented so that the seat structure of the front row seat S1 is physically separated from the footstool structure and the angle of the front row seat S1 is adjusted. Furthermore, an actuator (e.g., motor) for adjusting the angle of the vehicle seat S may be provided. The on and off of the lighting device L may be controlled by the processor 610 (or by a manual manipulation of a passenger). If the lighting device L includes a plurality of lighting units such as an internal light and a mood lamp, the on and off of each of the lighting units may be independently controlled. The angle of the user terminal 120 or the display 320 may be adjusted by the processor 610 (or by a manual manipulation of a passenger) based on an angle of field of a passenger. For example, the angle of the user terminal 120 or the display 320 may be adjusted so that a screen thereof is placed in a passenger's gaze direction. In this case, an actuator (e.g., motor) for adjusting the angle of the user terminal 120 and the display 320 may be provided.

As illustrated in FIG. 1, the autonomous driving integrated controller 600 may communicate with a server 700 over a network. Various communication methods, such as a wide area network (WAN), a local area network (LAN) or a personal area network (PAN), may be adopted as a network method between the autonomous driving integrated controller 600 and the server 700. Furthermore, in order to secure wide network coverage, a low power wide area network (LPWAN, including commercialized technologies such as LoRa, Sigfox, Ingenu, LTE-M and NB-IOT, that is, networks having very wide coverage, among the IoT) communication method may be adopted. For example, a LoRa (capable of low power communication and also having wide coverage of a maximum of about 20 Km) or Sigfox (having coverage of 10 Km (downtown) to 30 Km (in the outskirt area outside the downtown area) according to environments) communication method may be adopted. Furthermore, LTE network technologies based on $3^{rd}$ generation partnership project (3GPP) Release 12, 13, such as machine-type communications (LTE-MTC) (or LTE-M), narrowband (NB) LTE-M, and NB IoT having a power saving mode (PSM), may be adopted. The server 700 may provide the latest map information (may correspond to various types of map information, such as two-dimensional (2-D) navigation map data, three-dimensional (3-D) manifold map data or 3-D high-precision electronic map data). Furthermore, the server 700 may provide various types of information, such as accident information, road control information, traffic volume information and weather information in a road. The autonomous driving integrated controller 600 may update map information, stored in the memory 620, by receiving the latest map information from the server 700, may receive accident information, road control information, traffic volume information and weather information, and may use the information for autonomous driving control of a vehicle.

The structure and functions of the autonomous driving integrated controller 600 according to the present embodiment are described with reference to FIG. 2. As illustrated in FIG. 2, the autonomous driving integrated controller 600 may include the processor 610 and the memory 620.

The memory 620 may store basic information necessary for autonomous driving control of a vehicle or may store information generated in an autonomous driving process of a vehicle controlled by the processor 610. The processor 610 may access (or read) information stored in the memory 620, and may control autonomous driving of a vehicle. The memory 620 may be implemented as a computer-readable recording medium, and may operate in such a way to be accessed by the processor 610. Specifically, the memory 620 may be implemented as a hard drive, a magnetic tape, a memory card, a read-only memory (ROM), a random access memory (RAM), a digital video disc (DVD) or an optical data storage, such as an optical disk.

The memory 620 may store map information that is required for autonomous driving control by the processor 610. The map information stored in the memory 620 may be a navigation map (or a digital map) that provides information of a road unit, but may be implemented as a precise road map that provides road information of a lane unit, that is, 3-D high-precision electronic map data, in order to improve the precision of autonomous driving control. Accordingly, the map information stored in the memory 620 may provide dynamic and static information necessary for autonomous driving control of a vehicle, such as a lane, the center line of a lane, an enforcement lane, a road boundary, the center line of a road, a traffic sign, a road mark, the shape and height of a road, and a lane width.

Furthermore, the memory 620 may store the autonomous driving algorithm for autonomous driving control of a vehicle. The autonomous driving algorithm is an algorithm (recognition, determination and control algorithm) for recognizing the periphery of an autonomous vehicle, determining the state of the periphery thereof, and controlling the driving of the vehicle based on a result of the determination. The processor 610 may perform active autonomous driving control for a surrounding environment of a vehicle by executing the autonomous driving algorithm stored in the memory 620.

The processor 610 may control autonomous driving of a vehicle based on the driving information and the traveling information received from the driving information input interface 101 and the traveling information input interface 201, respectively, the information on a surrounding object detected by the sensor unit 500, and the map information and the autonomous driving algorithm stored in the memory 620. The processor 610 may be implemented as an embedded processor, such as a complex instruction set computer (CICS) or a reduced instruction set computer (RISC), or a dedicated semiconductor circuit, such as an application-specific integrated circuit (ASIC).

In the present embodiment, the processor 610 may control autonomous driving of an ego vehicle that autonomously travels by analyzing the driving trajectory of each of the ego vehicle that autonomously travels and a surrounding vehicle. To this end, the processor 610 may include a sensor processing module 611, a driving trajectory generation module 612, a driving trajectory analysis module 613, a driving control module 614, a passenger state determination module 616 and a trajectory learning module 615, as illustrated in FIG. 2. FIG. 2 illustrates each of the modules as an independent block based on its function, but the modules may be integrated into a single module and implemented as an element for integrating and performing the functions of the modules.

The sensor processing module 611 may determine traveling information of a surrounding vehicle (i.e., includes the location of the surrounding vehicle, and may further include the speed and moving direction of the surrounding vehicle along the location) based on a result of detecting, by the sensor unit 500, the surrounding vehicle around an ego vehicle that autonomously travels. That is, the sensor processing module 611 may determine the location of a surrounding vehicle based on a signal received through the LIDAR sensor 510, may determine the location of a surrounding vehicle based on a signal received through the radar sensor 520, may determine the location of a surrounding vehicle based on an image captured by the camera sensor 530, and may determine the location of a surrounding vehicle based on a signal received through the ultrasonic sensor 540. To this end, as illustrated in FIG. 1, the sensor processing module 611 may include a LIDAR signal processing module 611a, a radar signal processing module 611b and a camera signal processing module 611c. In some embodiments, an ultrasonic signal processing module (not illustrated) may be further added to the sensor processing module 611. An implementation method of the method of determining the location of a surrounding vehicle using the LIDAR sensor 510, the radar sensor 520 and the camera sensor 530 is not limited to a specific embodiment. Furthermore, the sensor processing module 611 may determine attribute information, such as the size and type of a surrounding vehicle, in addition to the location, speed and moving direction of the surrounding vehicle. An algorithm for determining information, such as the location, speed, moving direction, size and type of a surrounding vehicle, may be predefined.

The driving trajectory generation module 612 may generate an actual driving trajectory and expected driving trajectory of a surrounding vehicle and an actual driving trajectory of an ego vehicle that autonomously travels. To this end, as illustrated in FIG. 2, the driving trajectory generation module 612 may include a surrounding vehicle driving trajectory generation module 612a and a vehicle-being-autonomously-driven driving trajectory generation module 612b.

First, the surrounding vehicle driving trajectory generation module 612a may generate an actual driving trajectory of a surrounding vehicle.

Specifically, the surrounding vehicle driving trajectory generation module 612a may generate an actual driving trajectory of a surrounding vehicle based on traveling information of the surrounding vehicle detected by the sensor unit 500 (i.e., the location of the surrounding vehicle determined by the sensor processing module 611). In this case, in order to generate the actual driving trajectory of the surrounding vehicle, the surrounding vehicle driving trajectory generation module 612a may refer to map information stored in the memory 620, and may generate the actual driving trajectory of the surrounding vehicle by making cross reference to the location of the surrounding vehicle detected by the sensor unit 500 and a given location in the map information stored in the memory 620. For example, when a surrounding vehicle is detected at a specific point by the sensor unit 500, the surrounding vehicle driving trajectory generation module 612a may specify a currently detected location of the surrounding vehicle in map information stored in the memory 620 by making cross reference to the detected location of the surrounding vehicle and a given location in the map information. The surrounding vehicle driving trajectory generation module 612a may generate an actual driving trajectory of a surrounding vehicle by continuously monitoring the location of the surrounding vehicle as described above. That is, the surrounding vehicle driving trajectory generation module 612a may generate an actual driving trajectory of a surrounding vehicle by mapping the location of the surrounding vehicle, detected by the sensor unit 500, to a location in map information, stored in the memory 620, based on the cross reference and accumulating the location.

An actual driving trajectory of a surrounding vehicle may be compared with an expected driving trajectory of the surrounding vehicle to be described later to be used to determine whether map information stored in the memory 620 is accurate. In this case, if an actual driving trajectory of a specific surrounding vehicle is compared with an expected driving trajectory, there may be a problem in that it is erroneously determined that map information stored in the memory 620 is inaccurate although the map information is accurate. For example, if actual driving trajectories and expected driving trajectories of multiple surrounding vehicles are the same and an actual driving trajectory and expected driving trajectory of a specific surrounding vehicle are different, when only the actual driving trajectory of the specific surrounding vehicle is compared with the expected driving trajectory, it may be erroneously determined that map information stored in the memory 620 is inaccurate although the map information is accurate. In order to prevent this problem, it is necessary to determine whether the tendency of actual driving trajectories of a plurality of surrounding vehicles gets out of an expected driving trajectory. To this end, the surrounding vehicle driving trajectory generation module 612a may generate the actual driving trajectory of each of the plurality of surrounding vehicles. Furthermore, if it is considered that a driver of a surrounding vehicle tends to slightly move a steering wheel left and right during his or her driving process for the purpose of straight-line path driving, an actual driving trajectory of the surrounding vehicle may be generated in a curved form, not a straight-line form. In order to compute an error between expected driving trajectories to be described later, the surrounding vehicle driving trajectory generation module 612a may generate an actual driving trajectory of a straight-line form by applying a given smoothing scheme to the original actual driving trajectory generated in a curved form. Various schemes, such as interpolation for each location of a surrounding vehicle, may be adopted as the smoothing scheme.

Furthermore, the surrounding vehicle driving trajectory generation module 612a may generate an expected driving trajectory of a surrounding vehicle based on map information stored in the memory 620.

As described above, the map information stored in the memory 620 may be 3-D high-precision electronic map data. Accordingly, the map information may provide dynamic and static information necessary for autonomous driving control of a vehicle, such as a lane, the center line of a lane, an enforcement lane, a road boundary, the center line of a road, a traffic sign, a road mark, a shape and height of a road, and a lane width. If it is considered that a vehicle commonly travels in the middle of a lane, it may be expected that a surrounding vehicle that travels around an ego vehicle that autonomously travels will also travel in the middle of a lane. Accordingly, the surrounding vehicle driving trajectory generation module 612a may generate an expected driving trajectory of the surrounding vehicle as the center line of a road incorporated into map information.

The vehicle-being-autonomously-driven driving trajectory generation module 612b may generate an actual driving trajectory of an ego vehicle that autonomously travels that has been driven so far based on the traveling information of the ego vehicle that autonomously travels obtained through the traveling information input interface 201.

Specifically, the vehicle-being-autonomously-driven driving trajectory generation module 612b may generate an actual driving trajectory of an ego vehicle that autonomously travels by making cross reference to a location of the ego vehicle that autonomously travels obtained through the traveling information input interface 201 (i.e., information on the location of the ego vehicle that autonomously travels obtained by the GPS receiver 260) and a given location in map information stored in the memory 620. For example, the vehicle-being-autonomously-driven driving trajectory generation module 612b may specify a current location of an ego vehicle that autonomously travels, in map information, stored in the memory 620, by making cross reference to a location of the ego vehicle that autonomously travels obtained through the traveling information input interface 201 and a given location in the map information. As described above, the vehicle-being-autonomously-driven driving trajectory generation module 612b may generate an actual driving trajectory of the ego vehicle that autonomously travels by continuously monitoring the location of the ego vehicle that autonomously travels. That is, the vehicle-being-autonomously-driven driving trajectory generation module 612b may generate the actual driving trajectory of the ego vehicle that autonomously travels by mapping the location of the ego vehicle that autonomously travels, obtained through the traveling information input interface 201, to a location in the map information stored in the memory 620, based on the cross reference and accumulating the location.

Furthermore, the vehicle-being-autonomously-driven driving trajectory generation module 612b may generate an expected driving trajectory up to the destination of an ego vehicle that autonomously travels based on map information stored in the memory 620.

That is, the vehicle-being-autonomously-driven driving trajectory generation module 612b may generate the expected driving trajectory up to the destination using a current location of the ego vehicle that autonomously travels obtained through the traveling information input interface 201 (i.e., information on the current location of the ego vehicle that autonomously travels obtained through the GPS receiver 260) and the map information stored in the memory 620. Like the expected driving trajectory of the surrounding vehicle, the expected driving trajectory of the ego vehicle that autonomously travels may be generated as the center line of a road incorporated into the map information stored in the memory 620.

The driving trajectories generated by the surrounding vehicle driving trajectory generation module 612a and the vehicle-being-autonomously-driven driving trajectory generation module 612b may be stored in the memory 620, and may be used for various purposes in a process of controlling, by the processor 610, autonomous driving of an ego vehicle that autonomously travels.

The driving trajectory analysis module 613 may diagnose current reliability of autonomous driving control for an ego vehicle that autonomously travels by analyzing driving trajectories (i.e., an actual driving trajectory and expected driving trajectory of a surrounding vehicle and an actual driving trajectory of the ego vehicle that autonomously travels) that are generated by the driving trajectory generation module 612 and stored in the memory 620. The diagnosis of the reliability of autonomous driving control may be performed in a process of analyzing a trajectory error between the actual driving trajectory and expected driving trajectory of the surrounding vehicle.

The driving control module 614 may perform a function for controlling autonomous driving of an ego vehicle that autonomously travels. Specifically, the driving control module 614 may process the autonomous driving algorithm synthetically using the driving information and the traveling information received through the driving information input interface 101 and the traveling information input interface 201, respectively, the information on a surrounding object detected by the sensor unit 500, and the map information stored in the memory 620, may transmit the control information to the low-ranking control system 400 through the vehicle control output interface 401 so that the low-ranking control system 400 controls autonomous driving of an ego vehicle that autonomously travels, and may transmit the driving state information and warning information of the ego vehicle that autonomously travels to the output unit 300 through the passenger output interface 301 so that a driver can recognize the driving state information and warning information. Furthermore, when integrating and controlling such autonomous driving, the driving control module 614 controls the autonomous driving by taking into consideration the driving trajectories of an ego vehicle that autonomously travels and a surrounding vehicle, which have been analyzed by the sensor processing module 611, the driving trajectory generation module 612 and the driving trajectory analysis module 613, thereby improving the precision of autonomous driving control and enhancing the safety of autonomous driving control.

The trajectory learning module 615 may perform learning or corrections on an actual driving trajectory of an ego vehicle that autonomously travels generated by the vehicle-being-autonomously-driven driving trajectory generation module 612b. For example, when a trajectory error between an actual driving trajectory and expected driving trajectory of a surrounding vehicle is a preset threshold or more, the trajectory learning module 615 may determine that an actual driving trajectory of an ego vehicle that autonomously travels needs to be corrected by determining that map information stored in the memory 620 is inaccurate. Accordingly, the trajectory learning module 615 may determine a lateral shift value for correcting the actual driving trajectory of the ego vehicle that autonomously travels, and may correct the driving trajectory of the ego vehicle that autonomously travels.

The passenger state determination module 616 may determine a state and behavior of a passenger based on a state and bio signal of the passenger detected by the internal camera sensor 535 and the bio sensor. The state of the passenger determined by the passenger state determination module 616 may be used for autonomous driving control over an ego vehicle that autonomously travels or in a process of outputting a warning to the passenger.

Hereinafter, an embodiment in which a warning corresponding to an autonomous driving risk of an ego vehicle is output to a passenger is described based on the aforementioned contents.

As described above, (the driving trajectory generation module 612 of) the processor 610 according to the present embodiment may generate an actual driving trajectory of a surrounding vehicle based on driving information of the surrounding vehicle detected by the sensor unit 500. That is, when the surrounding vehicle is detected at a specific point by the sensor unit 500, the processor 610 may specify the location of the currently detected surrounding vehicle in map information by making cross reference to the location of the detected surrounding vehicle and a location in the map information stored in the memory 620. The processor 610 may generate the actual driving trajectory of the surrounding vehicle by continuously monitoring the location of the surrounding vehicle as described above.

Furthermore, (the driving trajectory generation module 612 of) the processor 610 may generate an expected driving trajectory of the surrounding vehicle based on the map information stored in the memory 620. In this case, the processor 610 may generate the expected driving trajectory of the surrounding vehicle as the middle line of a lane incorporated into the map information.

Thereafter, the processor 610 may determine an autonomous driving risk of the ego vehicle based on whether a driving mode of the surrounding vehicle is an autonomous driving mode and a trajectory error between the actual driving trajectory and expected driving trajectory of the surrounding vehicle, and may output a warning to a passenger through the output unit 300 at a level corresponding to the determined autonomous driving risk. The autonomous driving risk of the ego vehicle may be defined to mean the possibility that a collision against an external object may occur in the autonomous driving process of the ego vehicle. In this case, the processor 610 may output warnings to the passenger through the output unit 300, as first to third levels based on ascending order of the autonomous driving risk of the ego vehicle.

The warning corresponding to the first level may mean a warning output to the passenger when the autonomous driving risk of the ego vehicle is at the lowest level. For example, the warning corresponding to the first level may be implemented as an embodiment in which a visual display with a first color (e.g., blue) is output through the output unit 300. The warning corresponding to the second level may mean a warning output to the passenger when the autonomous driving risk of the ego vehicle is at a middle level. For example, the warning corresponding to the second level may be implemented as an embodiment in which a visual display with a second color (e.g., yellow) is output through the output unit 300. The warning corresponding to the third level may mean a warning output to the passenger when the autonomous driving risk of the ego vehicle is at the highest level. For example, the warning corresponding to the third level may be implemented as an embodiment in which a visual display with a third color (e.g., red) is output and a given voice warning is output along with the visual display, through the output unit 300. The visual warning and the auditory warning may be output through the display device 320 and speaker 310 of the output unit 300. Furthermore, the visual warning and the auditory warning are merely examples for helping understanding of the present embodiment, and may be implemented as various embodiments within the range in which a passenger may recognize a current level of the autonomous driving risk of an ego vehicle. A detailed implementation method of the embodiment is not limited to a specific embodiment. In addition, the detailed implementation method may include an additional implementation example, such as a warning using the vibration of a seat depending on the specifications of a vehicle. A method of outputting the warnings corresponding to the first to third levels may be set or modified by a passenger based on a UI provided by the user terminal 120 or a UI provided by the display device 320 itself.

A construction in which the processor 610 outputs a warning to the passenger through the output unit 300 at a level corresponding to an autonomous driving risk is described in detail. The processor 610 may determine whether a driving mode of a surrounding vehicle is the autonomous driving mode or the manual driving mode based on V2X communication.

When the driving mode of the surrounding vehicle is the autonomous driving mode, the processor 610 may output, to a passenger, the warning corresponding to the first level through the output unit 300. That is, when the driving mode of the surrounding vehicle is the autonomous driving mode, the possibility that an unexpected situation may occur due to the manual driving of the driver of the surrounding vehicle or the possibility that a collision against an ego vehicle may occur due to poor driving of the driver of the surrounding vehicle may be considered as being relatively low. In this case, the processor 610 may determine that the autonomous driving risk of the ego vehicle corresponds to the lowest level, and may output, to the passenger, the warning corresponding to the first level through the output unit 300.

When the driving mode of the surrounding vehicle is the manual driving mode, the processor 610 may output, to the passenger, the warning corresponding to the second level through the output unit 300. That is, when the driving mode of the surrounding vehicle is the manual driving mode, the possibility that an unexpected situation may occur due to the manual driving of the driver of the surrounding vehicle or the possibility that a collision against an ego vehicle may occur due to poor driving of the driver of the surrounding vehicle may be considered as being relatively high compared to a case where the surrounding vehicle travels in the autonomous driving mode. In this case, the processor 610 may determine that the autonomous driving risk of the ego vehicle corresponds to a middle level, and may output, to the passenger, the warning corresponding to the second level through the output unit 300.

As described above, the warning corresponding to the first or second level is output to a passenger through the process of determining whether a driving mode of a surrounding vehicle is the autonomous driving mode. Accordingly, the passenger can effectively recognize an autonomous driving risk attributable to an external factor, that is, an autonomous driving risk based on a collision between an ego vehicle and the surrounding vehicle, which is caused by the driving of the surrounding vehicle.

The processor 610 may perform the diagnosis of the reliability of autonomous driving control over an ego vehicle based on a trajectory error between an actual driving trajectory and expected driving trajectory of a surrounding vehicle. If, as a result of the execution, it is determined that the autonomous driving control over the ego vehicle is unreliable, the processor 610 may output, to a passenger, the warning corresponding to the third level through the output unit 300. When performing the diagnosis of reliability of the autonomous driving control over the ego vehicle, the processor 610 may perform the diagnosis of reliability of the autonomous driving control over the ego vehicle based on the size of a trajectory error between the actual driving trajectory and expected driving trajectory of the surrounding vehicle or the cumulative addition of the trajectory errors.

Specifically, the state in which a trajectory error is present between the actual driving trajectory and expected driving trajectory of the surrounding vehicle may correspond to the state in which the autonomous driving control performed on the ego vehicle is unreliable. That is, if an error is present between the actual driving trajectory generated based on driving information of the surrounding vehicle detected by the sensor unit 500 and the expected driving trajectory generated based on map information stored in the memory 620, this means the state in which the surrounding vehicle does not travel along the middle line of a lane in which the surrounding vehicle is expected to travel in the map information. This means that there is the possibility that the surrounding vehicle might be erroneously detected by the sensor unit 500 or the possibility that the map information stored in the memory 620 may be inaccurate. That is, two possibilities may be present. First, although a surrounding vehicle actually travels based on an expected driving trajectory, an error may occur in an actual driving trajectory of the surrounding vehicle due to the abnormality of the sensor unit 500. Second, the map information stored in the memory 620 and the state of a road on which the surrounding vehicle now travels may not be matched (e.g., the surrounding vehicles travel in a shifted lane because the lane has shifted to the left or right compared to the map information, stored in the memory 620, due to a construction or re-maintenance on a road on which the surrounding vehicle now travels). Accordingly, the processor 610 may perform the diagnosis of reliability of autonomous driving control over the ego vehicle based on the size of a trajectory error between the actual driving trajectory and expected driving trajectory of the surrounding vehicle or a cumulative addition of the trajectory errors. Furthermore, as described above, in order to take into consideration an overall driving tendency of the surrounding vehicle, trajectory errors between actual driving trajectories and expected driving trajectories of a plurality of surrounding vehicles, not an actual driving trajectory of any specific surrounding vehicle, may be taken into consideration.

A process of performing, by the processor 610, the diagnosis of reliability based on a trajectory error between an actual driving trajectory and expected driving trajectory of a surrounding vehicle is described in detail. First, when the state in which the size of a trajectory error is a preset first critical value or more occurs within a preset first critical time, the processor 610 may determine that autonomous driving control over an ego vehicle is unreliable.

In this case, the first critical time means a time preset to diagnose the reliability of the autonomous driving control. Timing, that is, a criterion for the time, may be timing at which a comparison between an actual driving trajectory and expected driving trajectory of a surrounding vehicle is initiated by the processor 610. Specifically, a process of generating, by the processor 610, an actual driving trajectory and expected driving trajectory of a surrounding vehicle, calculating a trajectory error between the actual driving trajectory and the expected driving trajectory, and diagnosing the reliability of autonomous driving control may be periodically executed in a preset determination cycle in order to reduce the resource of the memory 620 and a computational load of the processor 610 (accordingly, an actual driving trajectory and expected driving trajectory of a surrounding vehicle, stored in the memory 620, may be periodically deleted in the determination cycle). In this case, when the state in which the size of the trajectory error is the first critical value or more occurs before the first critical time elapses from timing at which any one cycle was initiated, the processor 610 may determine that the autonomous driving control is unreliable. The size of the first critical time, which is a value smaller than the size of the temporal section of the determination cycle, may be designed in various ways depending on a designer's intention and stored in the memory 620. Furthermore, the first critical value may also be designed in various ways depending on a designer's intention and stored in the memory 620.

Furthermore, the processor 610 may additionally perform the diagnosis of reliability using the cumulative addition of the trajectory errors while the size of the trajectory error is less than the first critical value for the first critical time. That is, although the size of the trajectory error is less than the first critical value for the first critical time, when an accumulated and added value of the trajectory errors less than the first critical value is a given value or more, the state of the surrounding vehicle corresponds to the state in which in spite of the small degree of error, the surrounding vehicle has traveled for a given time with deviating from the expected driving trajectory. Accordingly, the processor 610 can more precisely determine whether the autonomous driving control over the ego vehicle is reliable, by additionally performing the diagnosis of reliability using the cumulative addition of the trajectory errors.

In this case, in the state in which the size of the trajectory error is less than the first critical value for the first critical time, when the state in which a cumulative addition obtained by accumulating and adding the trajectory errors (i.e., an accumulated and added value of the trajectory errors within one cycle) is the preset second critical value or more occurs within a second critical time preset as a value greater than the first critical time, the processor 610 may determine that the autonomous driving control over the ego vehicle is unreliable. In this case, the second critical time, which is a value greater than the first critical time and smaller than the size of a temporal section of the determination cycle, may be previously stored in the memory 620. Furthermore, the second critical value may also be designed in various ways depending on a designer's intention and stored in the memory 620.

If it is determined through the aforementioned process that the autonomous driving control over the ego vehicle is unreliable, the processor 610 may output, to the passenger, the warning corresponding to the third level through the output unit 300. That is, an autonomous driving risk when it is determined through the aforementioned process that the autonomous driving control over the ego vehicle is unreliable may be considered as being higher than an autonomous driving risk caused in the autonomous driving mode or manual driving mode of the surrounding vehicle. Accordingly, the processor 610 may determine that the autonomous driving risk corresponds to the highest level, and may output, to the passenger, the warning corresponding to the third level through the output unit 300. In this case, the processor 610 may output the warning to the passenger through the output unit 300 by taking into consideration a state of the passenger (i.e., the state of the passenger determined by the passenger state determination module 616) detected by (the internal camera sensor 535 of) the sensor unit 500. In this case, if it is determined that the passenger does not keep eyes forward, the processor 610 may output the warning to the passenger through the output unit 300. Accordingly, the passenger can recognize the warning corresponding to the third level output through the output unit 300, and can take suitable follow-up measures by perceiving the possibility that an operation of the sensor unit 500 may be abnormal or the possibility that the map information stored in the memory 620 may be inaccurate.

As described above, the reliability of the autonomous driving control over the ego vehicle is diagnosed, and the warning corresponding to the third level is output to the passenger. Accordingly, the passenger can effectively recognize the autonomous driving risk attributable to an internal factor, that is, the autonomous driving risk attributable to a collision between the ego vehicle and the surrounding vehicle which is caused by erroneous autonomous driving control of the ego vehicle itself.

After outputting the warning to the passenger through the output unit 300, when the size of the trajectory error between the actual driving trajectory and expected driving trajectory of the surrounding vehicle becomes less than the first critical value or the cumulative addition of the trajectory errors becomes less than the second critical value, the processor 610 may release the warning output through the output unit 300. That is, after the warning is output, when the size of the trajectory error becomes less than the first critical value or the cumulative addition of the trajectory errors becomes less than the second critical value within any one cycle, this means that the reliability of the autonomous driving control over the ego vehicle has restored. Accordingly, the processor 610 can release the warning output through the output unit 300 to prevent an unnecessary warning from being output to a driver. In this case, if the warning is output at specific timing although the warning output through the output unit 300 has been released, this means that there is a possibility that the map information stored in the memory 620 may be inaccurate with respect to a specific point or section of a road. Accordingly, the processor 610 may update map information, stored in the memory 620, with new map information subsequently received from the server 700 at timing at which current autonomous driving control over an ego vehicle is not affected.

Furthermore, after outputting the warning to the passenger through the output unit 300, if it is determined that a state of the passenger detected by the sensor unit 500 is a forward looking state, the processor 610 may release the warning output through the output unit 300. That is, if the passenger keeps eyes forward after the warning has been output, it may be determined that the ego vehicle currently safely travels. Accordingly, the processor 610 can release the warning output through the output unit 300 to prevent an unnecessary warning from being output to a driver. Even in this case, the processor 610 may update map information, stored in the memory 620, with new map information subsequently received from the server 700 at timing at which current autonomous driving control over an ego vehicle is not affected.

When the autonomous driving mode of the ego vehicle is turned off based on an autonomous driving risk of the ego vehicle determined based on the trajectory error between the actual driving trajectory and expected driving trajectory of the surrounding vehicle, the processor 610 may control one or more of the driving of the ego vehicle and communication with an external organization based on a state of the passenger detected by the sensor unit 500. That is, even after the warning is output to the passenger through the output unit 300, if it is determined that the size of a trajectory error between the actual driving trajectory and expected driving trajectory of the surrounding vehicle is the first critical value or more or a cumulative addition of the trajectory errors is the second critical value or more and a state of the passenger detected by the sensor unit 500 does not correspond to the forward looking state, the processor 610 may turn off the autonomous driving mode in order to induce the manual driving of the passenger. After the autonomous driving mode is turned off, the processor 610 may control one or more of the driving of the ego vehicle and communication with an external organization based on a state of the passenger detected by the sensor unit 500.

An operation of the processor 610 is described which controls the driving of the ego vehicle and communication with an external organization, based on the state of the passenger after the autonomous driving mode of the ego vehicle is turned off. If a manual driving manipulation of the passenger is not performed after the autonomous driving mode of the ego vehicle is turned off, the processor 610 may change the driving mode of the ego vehicle to an emergency autonomous driving mode so that the ego vehicle can move to a specific point necessary for the passenger. That is, although the autonomous driving mode has been turned off, if a manual driving manipulation of the passenger is not detected through the steering angle sensor 210 or APS/PTS 220 of the driving information detector 200, the processor 610 may primarily determine that an emergency situation has occurred in the passenger, and may control the low-ranking control system 400 by allowing the driving mode of the ego vehicle to enter the emergency autonomous driving mode so that the ego vehicle moves to a specific point (e.g., a nearby hospital, an emergency room, a service station or a rest area) necessary for the passenger.

Furthermore, if a behavior of the passenger is not detected through the sensor unit 500 or the bio signal of the passenger detected by the sensor unit 500 has a pattern different from that of a normal bio signal previously stored in the memory 620 as a bio signal in the normal physical condition of the passenger, the processor 610 may transmit a rescue signal to an external organization.

That is, if a behavior of the passenger is not detected by the internal camera sensor 535 provided within the sensor unit 500 (i.e., the passenger does not move) or a bio signal (e.g., a pulse beat or a body temperature) of the passenger detected by a bio sensor provided within the sensor unit 500 has a pattern different from that of the normal bio signal, the processor 610 may determine that an emergency situation has occurred in the passenger, and may transmit a rescue signal to an external organization (e.g., a nearby hospital, a fire station or a police station) necessary for the passenger.

Figure 7:
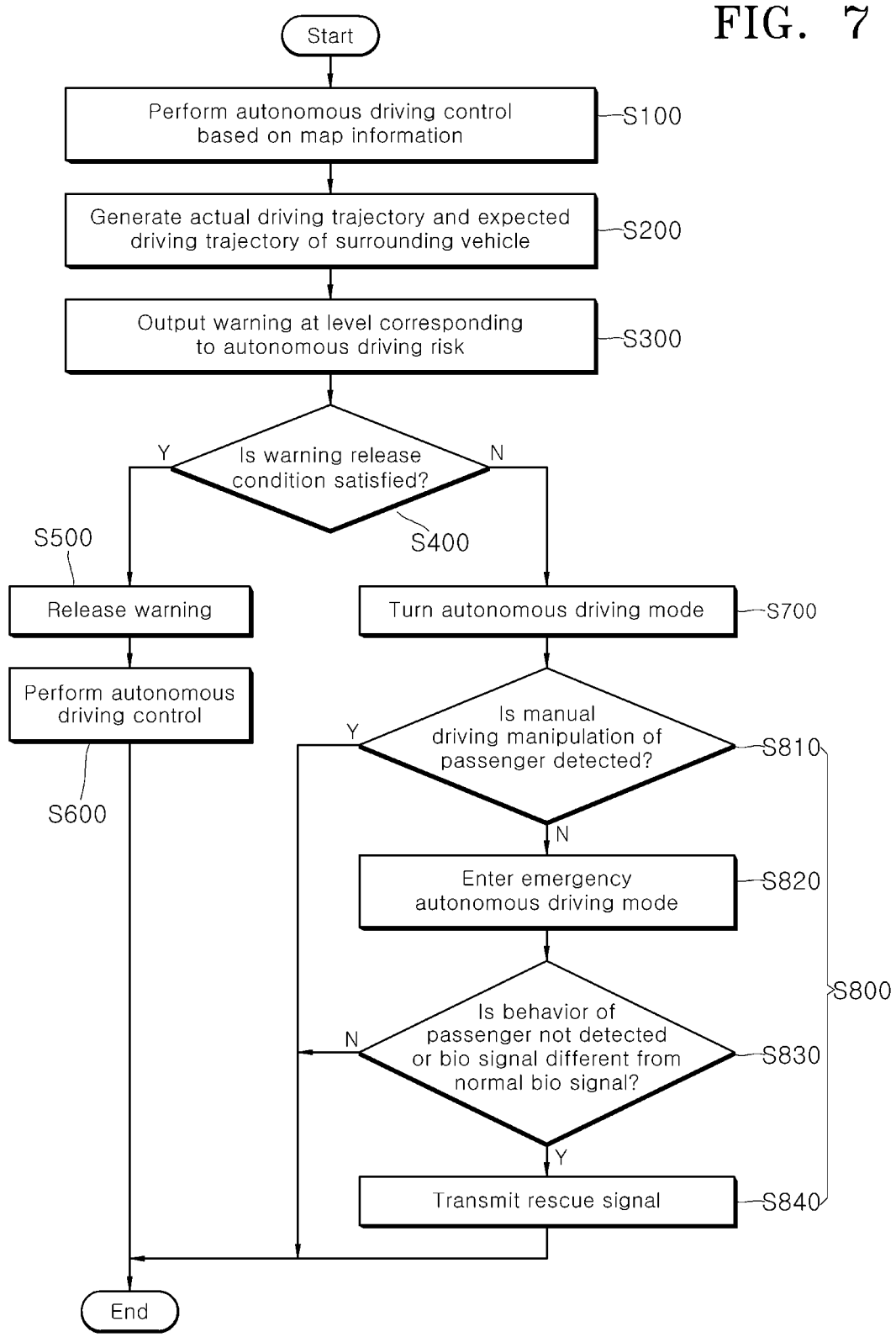
FIG. 7 is a flowchart for describing an autonomous driving method according to an embodiment of the present disclosure.
Figure 8:
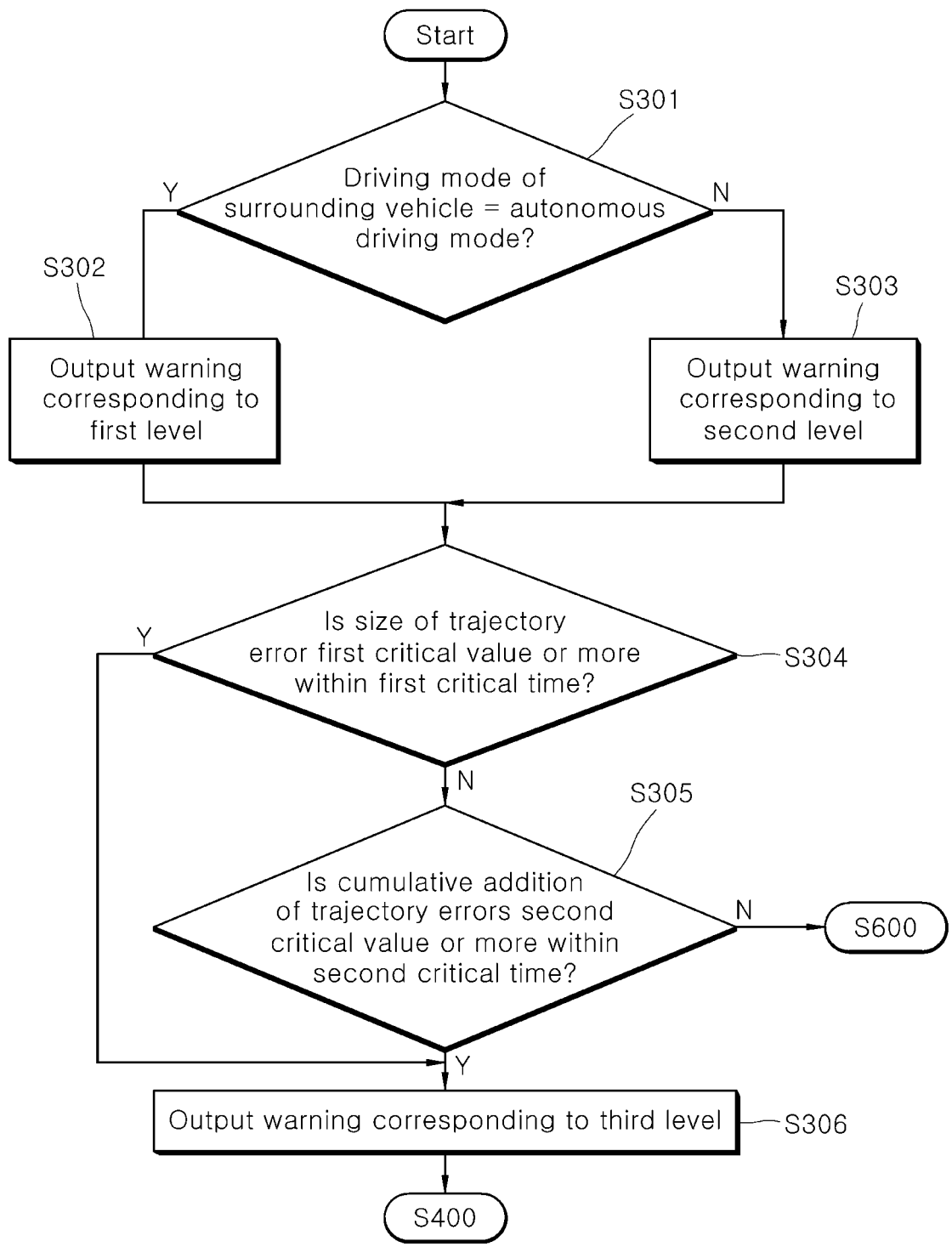
FIG. 8 is a flowchart for concretely describing a step of outputting a warning in the autonomous driving method according to the embodiment of the present disclosure.

FIG. 7 is a flowchart for describing an autonomous driving method according to an embodiment of the present disclosure. FIG. 8 is a flowchart for concretely describing a step of outputting a warning in the autonomous driving method according to the embodiment of the present disclosure.

The autonomous driving method according to the embodiment of the present disclosure is described with reference to FIG. 7. First, the processor 610 controls the autonomous driving over an ego vehicle based on map information stored in the memory 620 (S100).

Furthermore, the processor 610 generates an actual driving trajectory and expected driving trajectory of a surrounding vehicle around the ego vehicle based on driving information of the surrounding vehicle detected by the sensor unit 500 and map information stored in the memory 620 (S200).

Furthermore, the processor 610 determines an autonomous driving risk of the ego vehicle based on whether a driving mode of the surrounding vehicle is the autonomous driving mode and a trajectory error between the actual driving trajectory and expected driving trajectory of the surrounding vehicle, and outputs a warning to a passenger through the output unit 300 at a level corresponding to the determined autonomous driving risk (S300). At step S300, the processor 610 may output the warnings to the passenger through the output unit 300, as first to third levels based on ascending order of the autonomous driving risk of the ego vehicle.

Step S300 is described in detail with reference to FIG. 8. The processor 610 determines the driving mode of the surrounding vehicle (S301). If, as a result of the determination, the driving mode of the surrounding vehicle is the autonomous driving mode, the processor 610 outputs, to the passenger, a warning corresponding to the first level through the output unit 300 (S302). If, as a result of the determination at step S301, the driving mode of the surrounding vehicle is the manual driving mode, the processor 610 outputs, to the passenger, a warning corresponding to the second level through the output unit 300 (S303).

After step S302 or S303, the processor 610 performs the diagnosis of reliability of autonomous driving control over the ego vehicle based on the size of the trajectory error between the actual driving trajectory and expected driving trajectory of the surrounding vehicle or a cumulative addition of the trajectory errors. If, as a result of the execution of the diagnosis, it is determined that the autonomous driving control over the ego vehicle is unreliable, the processor 610 outputs, to the passenger, a warning corresponding to the third level through the output unit 300.

Specifically, when the state in which the size of the trajectory error between the actual driving trajectory and expected driving trajectory of the surrounding vehicle is a preset first critical value or more occurs within a preset first critical time (S304) or the state in which a cumulative addition obtained by accumulating and adding the trajectory errors is a preset second critical value or more occurs within a second critical time preset as a value greater than the first critical time (S305), in the state in which the size of the trajectory error is less than the first critical value for the first critical time, the processor 610 determines that the autonomous driving control over the ego vehicle is unreliable, and outputs, to the passenger, the warning corresponding to the third level through the output unit 300 (S306). If the state in which the cumulative addition is the second critical value or more does not occur at step S305, the processor 610 performs normal autonomous driving control (S600).

After step S300, if it is determined at step S400 that the size of the trajectory error between the actual driving trajectory and expected driving trajectory of the surrounding vehicle becomes less than the first critical value or the cumulative addition of the trajectory errors becomes less than the second critical value or a state of the passenger detected by the sensor unit 500 is a forward looking state (when a warning release condition in FIG. 7 is satisfied), the processor 610 releases the warning output through the output unit 300 (S500) and performs normal autonomous driving control (S600).

In contrast, after step S300, if it is determined at step S400 that the state of the passenger detected by the sensor unit 500 does not correspond to the forward looking state, in the state in which the size of the trajectory error is the first critical value or more or the cumulative addition of the trajectory errors is the second critical value or more (when the warning release condition in FIG. 7 is not satisfied), the processor 610 turns off the autonomous driving mode (S700).

After step S700, the processor 610 controls one or more of the driving of the ego vehicle and communication with an external organization based on a state of the passenger detected by the sensor unit 500 (S800).

At step S800, if a manual driving manipulation of the passenger is not performed (S810), the processor 610 allows the driving mode of the ego vehicle to enter the emergency autonomous driving mode so that the ego vehicle can move to a specific point necessary for the passenger (S820). Furthermore, when a behavior of the passenger is not detected by the sensor unit 500 or a bio signal of the passenger detected by the sensor unit 500 has a pattern different from that of a normal bio signal previously stored in the memory 620 as a bio signal in the normal physical condition of the passenger (S830), the processor 610 transmits a rescue signal to an external organization (S840).

As described above, in the present embodiment, it is possible to warn a passenger through an output device, such as a speaker or display device applied to an autonomous vehicle, by taking into consideration both an autonomous driving risk attributable to an external factor, determined through a process of determining whether a driving mode of a surrounding vehicle around an ego vehicle is the autonomous driving mode, and an autonomous driving risk attributable to an internal factor, determined through a process of performing the diagnosis of reliability of autonomous driving control over the ego vehicle. Accordingly, the passenger can accurately recognize an autonomous driving state of the ego vehicle and take suitable follow-up measures, thereby improving the driving stability and driving accuracy of the autonomous vehicle.

Furthermore, in the present embodiment, it is possible to effectively handle an emergency situation, which occurs in a passenger, by controlling the emergency driving of an ego vehicle and the transmission of a rescue signal to an external organization, based on a state of the passenger after the autonomous driving mode of the ego vehicle is turned off.

Although the present disclosure has been disclosed with reference to exemplary embodiments illustrated in the drawings, the exemplary embodiments are for illustrative purposes, and those skilled in the art will appreciate that various modifications and other equivalent exemplary embodiments are possible, without departing from the scope and spirit of the disclosure as defined in the accompanying claims. Thus, the true technical scope of the disclosure should be defined by the following claims.

What is claimed is:

1. An autonomous driving apparatus comprising:
   a sensor unit configured to detect a surrounding vehicle around an ego vehicle that autonomously travels and a state of a passenger who is in the ego vehicle;
   an output unit;
   a memory configured to store a map information; and
   a processor configured to control an autonomous driving of the ego vehicle based on the map information stored in the memory,
      wherein the processor is configured to:
         generate an actual driving trajectory and an expected driving trajectory of the surrounding vehicle based on driving information of the surrounding vehicle detected by the sensor unit and the map information stored in the memory,
         determine an autonomous driving risk of the ego vehicle based on whether a driving mode of the surrounding vehicle is an autonomous driving mode and a trajectory error between the actual driving trajectory and the expected driving trajectory of the surrounding vehicle,
         control one or more of driving modes of the ego vehicle and provide communication with an external organization, based on the state of the passenger detected by the sensor unit when the autonomous driving mode of the ego vehicle is turned off, and based on the determined autonomous driving risk of the ego vehicle; and
         output a warning to the passenger through the output unit at a level corresponding to the determined autonomous driving risk,
      wherein the output the warning comprises:
         output, to the passenger, the warning corresponding to a first level through the output unit when the driving mode of the surrounding vehicle is the autonomous driving mode, and
         output, to the passenger, the warning corresponding to a second level through the output unit when the driving mode of the surrounding vehicle is a manual driving mode,
      wherein the processor outputs the warnings to the passenger through the output unit, as the first level, the second level, or a third level warning based on ascending order of the autonomous driving risk of the ego vehicle,
wherein the first warning is a visual display of a first color, the second warning is a visual display of a second color different from the first color, and the third warning is a visual display of a third color different from the first and second colors.

2. The autonomous driving apparatus of claim 1, wherein the processor is configured to:
perform a diagnosis of reliability of the autonomous driving control over the ego vehicle based on a size of the trajectory error between the actual driving trajectory and expected driving trajectory of the surrounding vehicle or a cumulative addition of the trajectory errors, and
output, to the passenger, the warning corresponding to the third level warning through the output unit if, as a result of an execution of the diagnosis, it is determined that the autonomous driving control over the ego vehicle is unreliable.

3. The autonomous driving apparatus of claim 2, wherein the processor is configured to determine that the autonomous driving control over the ego vehicle is unreliable, when the state in which the size of the trajectory error occurs within a preset first critical time.

4. The autonomous driving apparatus of claim 3, wherein the processor is configured to release the warning output through the output unit when the size of the trajectory error is less than the first critical value, when the cumulative addition of the trajectory errors is less than a second critical value or when it is determined that the state of the passenger detected by the sensor unit is a forward looking state, after outputting the warning to the passenger through the output unit.

5. The autonomous driving apparatus of claim 4, wherein the processor is configured to turn off the autonomous driving mode of the ego vehicle if it is determined that the state of the passenger detected by the sensor unit does not correspond to the forward looking state, in a state in which the size of the trajectory error is the first critical value or more or the cumulative addition of the trajectory errors is the second critical value or more.

6. The autonomous driving apparatus of claim 5, wherein the processor is configured to allow the driving mode of the ego vehicle to enter an emergency autonomous driving mode so that the ego vehicle moves to a specific point necessary to the passenger, when a manual driving manipulation is not performed by the passenger after the autonomous driving mode of the ego vehicle is turned off.

7. The autonomous driving apparatus of claim 6, wherein the processor is configured to transmit a rescue signal to the external organization when a behavior of the passenger is not detected through the sensor unit or a bio signal of the passenger detected through the sensor unit has a pattern different from that of a normal bio signal previously stored in the memory as a bio signal in a normal physical state of the passenger.

8. An autonomous driving method comprising:
controlling, by a processor, an autonomous driving of an ego vehicle based on a map information stored in a memory;
generating, by the processor, an actual driving trajectory and an expected driving trajectory of a surrounding vehicle around the ego vehicle based on driving information of the surrounding vehicle detected by a sensor unit and the map information stored in the memory;
determining an autonomous driving risk of the ego vehicle based on whether a driving mode of the surrounding vehicle is an autonomous driving mode and a trajectory error between the actual driving trajectory and the expected driving trajectory of the surrounding vehicle;
controlling, by the processor, one or more of driving modes of the ego vehicle and providing communication with an external organization, based on the state of a passenger detected by the sensor unit when the autonomous driving mode of the ego vehicle is turned off, and based on the determined autonomous driving risk of the ego vehicle; and
outputting a warning to the passenger through the output unit at a level corresponding to the determined autonomous driving risk,
wherein the outputting the warning comprises:
outputting, to the passenger, the warning corresponding to a first level through the output unit when the driving mode of the surrounding vehicle is the autonomous driving mode, and
outputting, to the passenger, the warning corresponding to a second level through the output unit when the driving mode of the surrounding vehicle is a manual driving mode,
wherein the processor outputs the warnings to the passenger through the output unit, as the first level, the second level, or a third level warning based on ascending order of the autonomous driving risk of the ego vehicle,
wherein the first warning is a visual display of a first color, the second warning is a visual display of a second color different from the first color, and the third warning is a visual display of a third color different from the first and second colors.

9. The autonomous driving method of claim 8, wherein in the outputting of the warning, the processor performs a diagnosis of reliability of the autonomous driving control over the ego vehicle based on a size of the trajectory error between the actual driving trajectory and expected driving trajectory of the surrounding vehicle or a cumulative addition of the trajectory errors, and outputs, to the passenger, the warning corresponding to the third level warning through the output unit if, as a result of an execution of the diagnosis, it is determined that the autonomous driving control over the ego vehicle is unreliable.

10. The autonomous driving method of claim 9, wherein in the outputting of the warning, the processor determines that the autonomous driving control over the ego vehicle is unreliable, when the state in which the size of the trajectory occurs within a preset first critical time.

11. The autonomous driving method of claim 10, further comprising, after the outputting of the warning, releasing, by the processor, the warning output through the output unit, when the size of the trajectory error is less than the first critical value, when the cumulative addition of the trajectory errors is less than a second critical value or when it is determined that the state of the passenger detected by the sensor unit is a forward looking state.

12. The autonomous driving method of claim 11, further comprising turning off, by the processor, the autonomous driving mode of the ego vehicle if it is determined that the state of the passenger detected by the sensor unit does not correspond to the forward looking state, in a state in which the size of the trajectory error is the first critical value or more or the cumulative addition of the trajectory errors is the second critical value or more.

13. The autonomous driving method of claim 12, wherein in the controlling of one or more of the driving of the ego vehicle and the communication, the processor allows the driving mode of the ego vehicle to enter an emergency autonomous driving mode so that the ego vehicle moves to a specific point necessary to the passenger, when a manual driving manipulation is not performed by the passenger after the autonomous driving mode of the ego vehicle is turned off.

14. The autonomous driving method of claim 13, wherein in the controlling of one or more of the driving of the ego vehicle and the communication, the processor transmits a rescue signal to the external organization when a behavior of the passenger is not detected through the sensor unit or a bio signal of the passenger detected through the sensor unit has a pattern different from that of a normal bio signal previously stored in the memory as a bio signal in a normal physical state of the passenger.

\* \* \* \* \*